Figure 1:
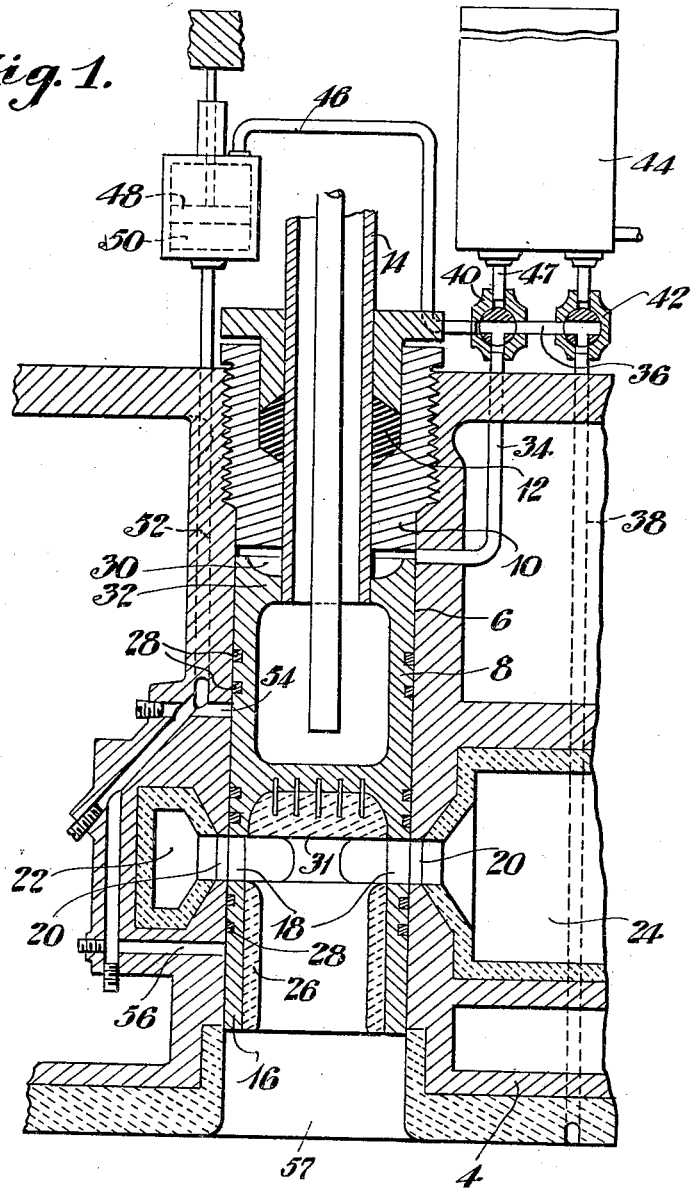

July 7, 1931.  W. E. GOLDSBOROUGH  1,813,846

PISTON VALVE

Filed July 5, 1929   2 Sheets-Sheet 1

Inventor
WINDER E. GOLDSBOROUGH
By his Attorney
Edmund G Borden

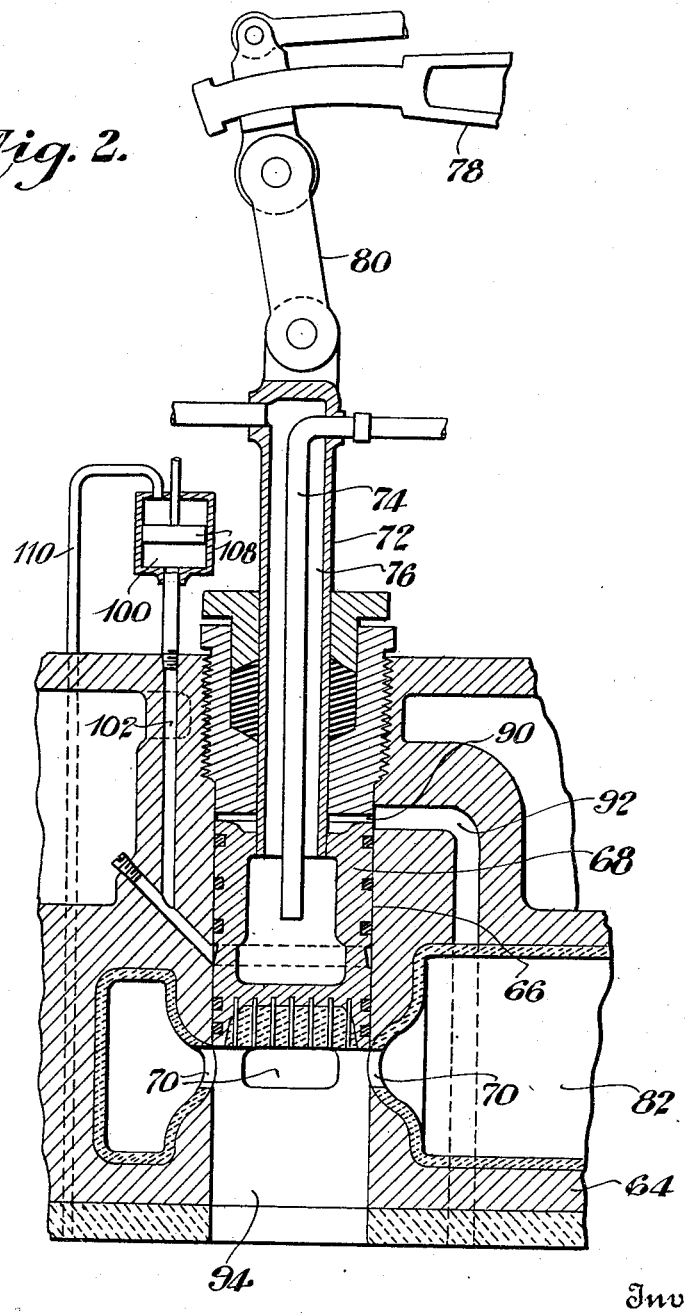

Patented July 7, 1931

1,813,846

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

PISTON VALVE

Application filed July 5, 1929. Serial No. 376,015.

This invention relates generally to piston valves, particularly to piston valves adapted to be exposed to high temperatures and pressures such as those to which the exhaust valves, and transfer valves, of internal combustion engines or the inlet valves of hot air or external combustion engines, are exposed.

It is one of the principal objects of this invention to provide a piston valve which shall be adequately protected from the high temperatures present in the engine or other device with which it is used. To this end it is a feature of the invention to coat the surfaces of the valve which are exposed to the high temperatures with a heat insulating refractory material.

It is a further object of this invention to balance the valve against the high pressures occurring in the engine to prevent shocks to the actuating mechanism thereof and to make it possible to actuate the same against extremely high pressures.

It is a further object of this invention to provide for the effective lubrication of the sides of the piston valve and to effectively seal the same from leakage of high pressure gases when the valve is in closed position. To this end it is a feature of this invention to place the lubricating oil under a varying pressure which is at all times directly proportionate to the pressure within the engine, while at the same time maintaining the parts to which the lubricant is supplied at a sufficiently low temperature to prevent the same from being burned, cracked, or materially vaporized.

These and other objects of the invention will more fully appear in connection with the accompanying drawings, in which:—

Fig. 1 is a longitudinal section through one form of valve constructed in accordance with this invention; and Fig. 2 is a longitudinal section through a slightly modified type of valve possessing the same general characteristics.

Referring to Fig. 1, 4 indicates the cylinder head or other wall of an engine which is provided with a cylindrical bore 6 extending thereto forming a cylindrical chamber in which a piston valve 8 is adapted to reciprocate. The upper end of the cylinder 6 is provided with a bushing 10 adapted to accommodate a packing gland 12 through which rod 14 of the piston 8 is adapted to slide.

The piston 8 has an extension sleeve 16 integral therewith from which extend a plurality of passages 18 disposed close to the head of the piston and adapted to register when the piston is in its outermost position with passages 20 extending through the wall of the cylinder 6. The passages 20 communicate with an annular chamber 22 extending about the cylinder 6 which affords communication between a passage 24, and all of the passages 20. The walls of the cylinder 6 piston 8 and the passages 22 and 24 which are exposed to the high temperature of the gases present in the engine are surfaced with a refractory material as indicated at 26.

The piston 8 is provided with a plurality of piston rings 28, a pair of these being positioned upon each side of the passages 18 while others are positioned higher up the piston. The arrangement is such that the rings slide only upon the metallic surface of the cylinder 6 and do not contact with the portion thereof which is lined with refractory material.

A chamber 30 formed above an upper face 32 of the piston 8 is connected with the working space of the engine by means of passages 34, 36 and 38 which are controlled by a pair of three-way cocks 40 and 42 so that the piston's upper face 32 is, when these valves are in the proper position, exposed to the same pressures as its lower face 31.

The passage 38 may also be utilized as the means for placing the lubricating oil under pressure through the intermediary of valves 40 and 42. A pressure tank 44 is provided adjacent these valves so that the same may be filled with fluid under pressure when desired. The pressure in tank 44 may be transmitted by pipes 46 and 47 through the intermediary of a piston 48 to a body of oil in a chamber 50 or pressure may be directly transmitted to this chamber via pipes 38, 36 and 46. The chamber 50 is connected by passage 52 to different points 54 and 56 upon the surface of the cylinder 6 to provide for the lubrication of that portion of the cylinder against which the rings 28 slide. By this means the clearance space between the cylinder 6 and the piston 8 is supplied with lubricant which is at a pressure proportional to the pressure in the working space of the engine. There is therefore no tendency for the fluid in the working space to blow out through the clearance between the piston 8 and the cylinder 6 when the pressure in the engine is high nor for the lubricating oil to be sucked through this clearance space into the engine during a period of reduced pressure such as may occur upon the suction stroke of the working piston.

Referring to Fig. 2, 64 indicates a cylinder head analogous to the cylinder head 4 shown in Fig. 1, and 66 indicates a cylinder having a piston 68 slidable therein. The piston controls ports 70 in the side wall of the cylinder 66 in a manner similar to that shown in connection with Fig. 1. In this case no extension is provided upon the end of the piston 68, the ports being opened and closed simply by being uncovered or cut off by the lower edge of the piston. A rod 72, attached to the piston 68 for the purpose of reciprocating the same, is of hollow construction and has a pipe 74 extending therethrough for the passage of cooling liquid to the interior of the piston 68. The discharge of the liquid after circulation therein is effected through an annular channel 76 formed between the inner wall of the rod 72 and the pipe 74. A cooling liquid preferably is used in the piston 8 shown in Fig. 1. Both forms of the piston are preferably actuated by mechanism including an eccentrically driven rocker arm 78 which is connected with the rod 72 by means of an adjustable link 80 to control the extent of actuation of the piston valve and thereby the timing relative to the driving mechanism by which the lower edge of the piston traverses the passages 70.

Lubricating oil is supplied to the side walls of the cylinder 66, the piston 68 from a chamber 100 connected thereto by a passage 102. Within the chamber 100 is a piston 108 a face of which acts upon the lubricant therein and the opposite face of which is exposed to the pressure in the engine the same being transmitted thereto directly from the working space by way of a passage 110.

In the operation of the device shown in Fig. 1, when the parts are in the position shown the passages 18 are in registry with the ports 20, thus permitting the admission or discharge of gases to or from the engine as the case may be. Upon the completion of such admission or discharge the valve is moved downwardly by suitable actuating mechanism (not shown). The ports 20 are closed by the piston 8. The lower face 31 of the piston 8 is brought in closer contact with the cylinder head 4, thus reducing the clearance. The piston remains in this position while combustion is taking place in the engine and even though this combustion should be of an explosive nature so that the pressure against the face 31 of the piston is extremely high the piston can transmit little of this force through the rod 14 to the actuating mechanism because the piston is being held stationary by the pressure balance through 38, 36 and 34.

In this construction the volume of the chamber 30 is negligible when the piston 8 is in its uppermost position so that but a small flow of gases through passages 34, 36 and 38 is necessary to equalize the pressures against faces 31 and 32 of the piston. Such equalization is also necessary to offset the combustion or explosion pressure against an intake or transfer valve of this design when passage 57 communicates with the engine cylinder but not when passage 24 communicates with the engine cylinder. In case the piston is used as an exhaust valve it does not require to be actuated downwardly against so high a pressure. It is therefore to aid in the initial opening movement of the valve that equalizing passages are provided in this construction.

In the operation of the device as shown in Fig. 2 when the parts are in the position shown the passages 70 are open for the admission or discharge of gases. To close these passages the piston 68 must be actuated downwardly. This necessitates leaving a comparatively large clearance space 90 above the piston 68 when the same is in its closed position. To completely equalize the pressures between this clearance space 90 and the clearance space 94 of the engine, preferably a large passage 92 is provided therebetween. The constructions shown in Figs. 1 and 2 are in general much the same.

It will be observed that there must be a certain time lag before any abrupt rise in pressure in space 94 will be equalized in space 90. The construction shown in Fig. 1 is therefore suitable for constant pressure engines such, for example, as Diesel engines in which the pressure rises gradually to its maximum during the compression stroke thus enabling full equalization to take place before combustion occurs in the space 94.

The construction shown in Fig. 2 while also suitable for use in Diesel and other types of constant pressure engines is also adapted for use in Otto cycle or similar engines in which there is a sudden rise in pressures.

At times, when piston valves of the type disclosed in this invention are used to control fluids of excessively high pressures, the functions of the passages 24 and 57, Fig. 1 (or of 82 and 94, Fig. 2) should be interchanged; that is to say, passage 24 (or 82) should be made to communicate directly with the engine cylinder or other source of very high pressure fluid, since by this arrangement when the ports 20 (or 70) are closed by the piston 32 (or 68) the pressures are effectively cut off from adversely influencing the action of the piston.

It will be evident from the foregoing description of the invention that the construction disclosed provides a valve which is effectively balanced against the varying pressures in the working space or combustion chamber of the engine. The construction also avoids compression losses while at the same time conserving lubricating oil.

It will be understood that while the invention has been described in connection with engines, in which it is particularly useful, it is, in its broader aspects, not limited thereto but is suitable for use wherever it is desirable to control the flow of hot or corrosive fluids.

Although there are herein described but two specific embodiments of the invention it will be obvious to those skilled in the art that various modifications may be made in the details of construction and in the design and proportions of the operating parts without departing from the principles herein set forth.

The invention having been thus described, what is claimed as new is:

1. A piston valve for controlling the flow of fluid to or from an engine, means to supply lubricating oil to the surface of said piston under pressures equalized to counteract the fluid pressures opposing the flow of said lubricating oil.

2. A piston valve for controlling the flow of fluids to or from the working space of an engine and having a face exposed to the pressure of said controlled fluids, a closed chamber in the rear of said piston and a passage connecting said chamber with the controlled fluids acting upon said face.

3. A piston valve for controlling the flow of fluids to or from the working space of an engine and having a face exposed to the pressure of said controlled fluids, a closed chamber in the rear of said piston, a passage connecting said chamber with the controlled fluids acting upon said face, means to supply a lubricant to the surface of said piston and a passage connected with said working space for placing said lubricant under pressure.

4. In an engine having a cylinder and a moving element exposed to the pressure therein, means to supply a lubricant to said element under pressure which is at all times proportional to the pressure in said cylinder.

5. A piston valve for controlling the flow of fluid under pressure, means to supply a lubricant to the side walls of said piston under a pressure which is dependent upon the pressure of the controlled fluid.

6. A piston valve having parts exposed to the pressure in an engine, means to hold said piston in a balanced relation against the highest pressure in said engine.

7. A piston valve for an internal combustion engine having parts exposed to the pressure therein, means to hold said piston in an equalized pressure relation to the highest forces of compression and combustion in said engine.

8. A piston valve for an internal combustion engine having parts exposed to the pressure therein, means to hold said piston in an equalized pressure relation under the highest forces of combustion and compression in said engine, and means to apply equalized pressures to the opposite faces of said piston valve to balance the same.

In testimony whereof I affix my signature.

WINDER E. GOLDSBOROUGH.